(12) United States Patent
Hamaker et al.

(10) Patent No.: US 8,442,826 B2
(45) Date of Patent: May 14, 2013

(54) APPLICATION-DEPENDENT INFORMATION FOR RECOGNITION PROCESSING

(75) Inventors: Jonathan E. Hamaker, Issaquah, WA (US); Julian James Odell, Kirkland, WA (US); Michael D. Plumpe, Seattle, WA (US); Sandeep Manocha, Redmond, WA (US); Keith C. Herold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 12/481,612

(22) Filed: Jun. 10, 2009

(65) Prior Publication Data

US 2010/0318359 A1    Dec. 16, 2010

(51) Int. Cl.
*G10L 15/00* (2006.01)
(52) U.S. Cl.
USPC .............................. 704/251; 704/10; 704/244
(58) Field of Classification Search .................... 704/10, 704/244, 251
See application file for complete search history.

(56) References Cited

U.S. PATENT DOCUMENTS

| | | | |
|---|---|---|---|
| 5,748,841 A | 5/1998 | Morin et al. | |
| 6,188,976 B1* | 2/2001 | Ramaswamy et al. | 704/9 |
| 6,510,411 B1 | 1/2003 | Norton et al. | |
| 7,146,323 B2 | 12/2006 | Guenther et al. | |
| 2006/0074670 A1 | 4/2006 | Weng et al. | |
| 2006/0089835 A1* | 4/2006 | Bisson et al. | 704/257 |
| 2008/0040099 A1* | 2/2008 | Wu et al. | 704/9 |
| 2009/0055184 A1* | 2/2009 | Hebert | 704/257 |
| 2009/0228271 A1* | 9/2009 | DeSimone | 704/231 |

OTHER PUBLICATIONS

Oshry, et al."VoiceXML 2.1 Disposition of Comments", Retrieved at<<http://www.w3.org/TR/voicexml21/voicexml21-disp.html>>, Apr. 11, 2007.
Schalkwyk, et al."Speech Recognition with Dynamic Grammars Using Finite-State Transducers", Retrieved at<<http://groups.csail.mit.edu/sls/publications/2003/EURO_Hetherington.pdf>>, EUROSPEECH 2003—Geneva, pp. 1969-1972.
Foster, et al."Multimodal Generation in the COMIC Dialogue System", Retrieved at<<http://homepages.inf.ed.ac.uk/mef/papers/foster-etal-acl2005-demo.pdf>>.
Lison Pierre, "A Salience-Driven Approach to Speech Recognition for Human-Robot Interaction", Retrieved at<<http://www.coli.uni-saarland.de/~pierrel/pubs/cl/situatedASR-ESSLL108.pdf>>, Oct. 9, 2008, pp. 1-10.
Lee McCauley, "Using Latent Semantic Analysis to Aid Speech Recognition and Understanding", Retrieved at<<http://www.cs.memphis.edu/~tmccauly/McCauley03UsingLSA.pdf>>, 2004, 6 pages.

* cited by examiner

*Primary Examiner* — Daniel D Abebe

(57) ABSTRACT

Architecture for integrating application-dependent information into a constraints component at deployment time or when available. In terms of a general grammar, the constraints component can include or be a general grammar that comprises application-independent information and is structured in such a way that application-dependent information can be integrated into the general grammar without loss of fidelity. The general grammar includes a probability space and reserves a section of the probability space for the integration of application-dependent information. An integration component integrates the application-dependent information into the reserved section of the probability space for recognition processing. The application-dependent information is integrated into the reserved section of the probability space at deployment time or when available. The general grammar is structured to support the integration and improve the overall system.

19 Claims, 8 Drawing Sheets

APPLICATION-DEPENDENT INFORMATION FOR RECOGNITION PROCESSING

BACKGROUND

Speech recognition systems use grammars to constrain the space of possible spoken utterances. In most cases, these grammars are built well before deployment and are carefully tuned to achieve best performance in the general case and for a general class of users. However, it is often the case that the application gains contextual information about the specific user, the specific scenario, the specific environment, or other specific information of value at deployment time which could be leveraged in the grammar. Moreover, a user typically has valuable information that is not known until the system is deployed and running. This late-binding effect suggests technology to support parsimonious integration of application-dependent information into the general grammar at a desired time.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a technique for integrating application-dependent information into a constraints component, for example a general grammar, at deployment time or when available. The constraints component contains application-independent information and is structured in such a way that application-dependent information can be integrated into the constraints component without loss of fidelity or a need to understand the application-independent information in any significant detail.

The constraints component includes a probability space, wherein a section of this probability space is retained for new words that a user learns or new information that the user adds to the dictionary. Once these new words or new information is added to the probability space, the constraints component can recognize the information with a relatively high likelihood. The constraints component then reserves at least one section of the probability space for the integration of application-dependent information, such as application specific information, deployment specific information, and/or user specific information. Furthermore, the size of the reserved section of the probability space can be dependent on the amount of information added.

The architecture can also include an integration component for integrating the application-dependent information into the reserved section of the probability space for recognition processing. The application-dependent information is integrated into the reserved section of the probability space at deployment time or when available. The constraints component is structured to restrictively support the integration and improve the overall system.

Furthermore, the application-dependent information is optional and the constraints component remains functional even if the application-dependent information is unavailable. Accordingly, the system is constructed such that the application-dependent information is not required, because there may be no application-dependent information. Moreover, if there is no application-dependent information, the system will still function for the general user while being capable of functioning for the specific user of a specific scenario when the specific scenario actually exists.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
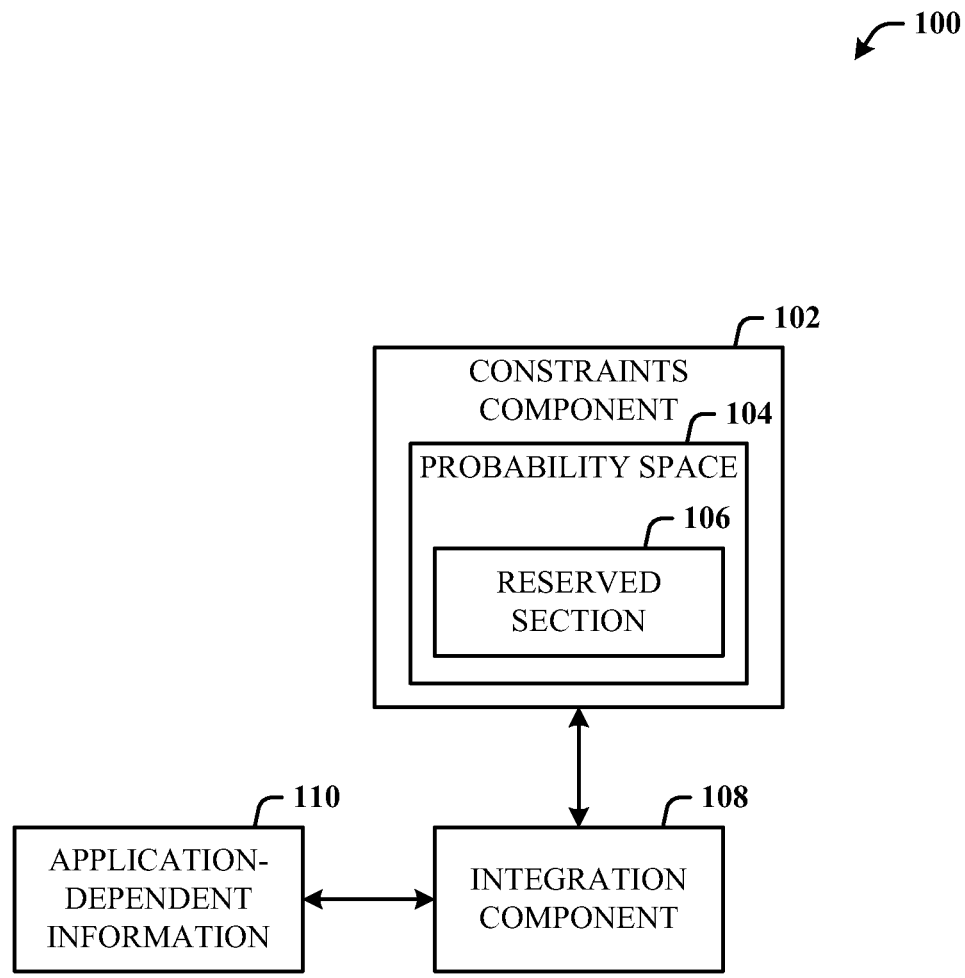
FIG. 1 illustrates a computer-implemented recognition system in accordance with the disclosed architecture.

Disclosed is a constraints architecture where some of the constraints (e.g., rules, probabilities, paths, etc.) are known a priori and other constraints can be derived based on conditions at the time the constraints are applied. A language model (or grammar) is an example of a constraint system. The constraint architecture is independent of the invoking application such that the constraint architecture can stand alone with now added information from the invoking application. Moreover, the constraint architecture is sufficiently flexible and robust so that the invoking application can incorporate relevant constraints at the time of invocation. Thus, the constraint architecture is never dependent on the specific application of the grammar. In other words, the constraint architecture is independent of any specific instance of use.

More specifically, the constraint architecture allows the integration of application-dependent information into a general grammar at deployment time or when available. Grammars are built well before deployment and are carefully tuned to achieve optimal performance in the general case and for a general class of users. However, typically an application gains contextual information about the specific user, the specific scenario, the specific environment, or other specific information of value at deployment time which could be leveraged in the grammar. This contextual information is considered application-dependent information. The disclosed architecture supports optimal integration of application-dependent information into the general grammar at deployment time or when available.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented recognition system 100 in accordance with the disclosed architecture. The system 100 includes a constraints component 102 for parsing input data. The constraints component 102, for example a general grammar, can be created by mining word processing documents, emails, or other data, and/or the general grammar can be pre-manufactured and built with general information for a generalized user. Moreover, the general grammar, as employed as the constraints component 102, can be based on newspapers, voice mails, business logic, documents (e.g., government), etc.

Thus, the application-dependent information comes from data, as well as from business logic. For example, the data is mostly from a recipient's inbox and contact list, augmented with caller identification (ID) and name, if available. However, information could also be aggregated not only across recipient inboxes, contact lists, message stores, etc., but also aggregated caller information throughout a deployment or specific caller information from a generalized data store, such as a directory service.

Further, the constraints component 102 interfaces (e.g., includes) to a defined probability space 104. A section of this probability space 104 can be retained for new words that are learned (e.g., by user, by system, etc.) and/or new information that is added to a dictionary, for example. Once these new words and/or new information are added to the probability space 104, the constraints component 102 can parse the data with a relatively high likelihood.

The constraints component 102 can also provide a reserved section 106 (e.g., of the probability space 104) for the integration of application-dependent information 110. The reserved section 106 can be divided into multiple sections for inclusion of additional data, and can also have multiple independent reserved sections. For example in an n-gram, the reserved section 106 can be divided into a top-level reserved section (e.g., for new words), a reserved section for names (in a names rule part of the probability space 104), and a reserved section for phone numbers (in a phone number rule part of the probability space 104).

The probability space 104 is reserved based on knowing that at deployment or at the point at which information (e.g., customer) is discovered, the reserved section 106 of the probability space 104 is integrated with application-dependent information 110 specific to the user, specific to the environment, specific to the scenario, and/or other information specific to the interaction. Thus, the application-dependent information 110 is specific to a particular use of the grammar. For example, for a voicemail, the application-dependent information 110 could be about the caller, the callee, the caller/callee pair (e.g. previous conversation history between the two individuals), the time of the call, the day of the call, information from or about the caller or callee organization, etc.

Generally, a grammar is created that can be extended by another sub-grammar or a reference to another grammar that is not yet known. An application then produces that sub-grammar and integrates the sub-grammar into the reserved section 106. Further, an integration component 108 is utilized to integrate the application-dependent information 110 (or sub-grammar) into the reserved section 106. The constraints component 102 is structured to restrictively or optimally support the integration. Thus, the integration of the application-dependent information 110 is a clean integration that improves the overall system.

Figure 2:
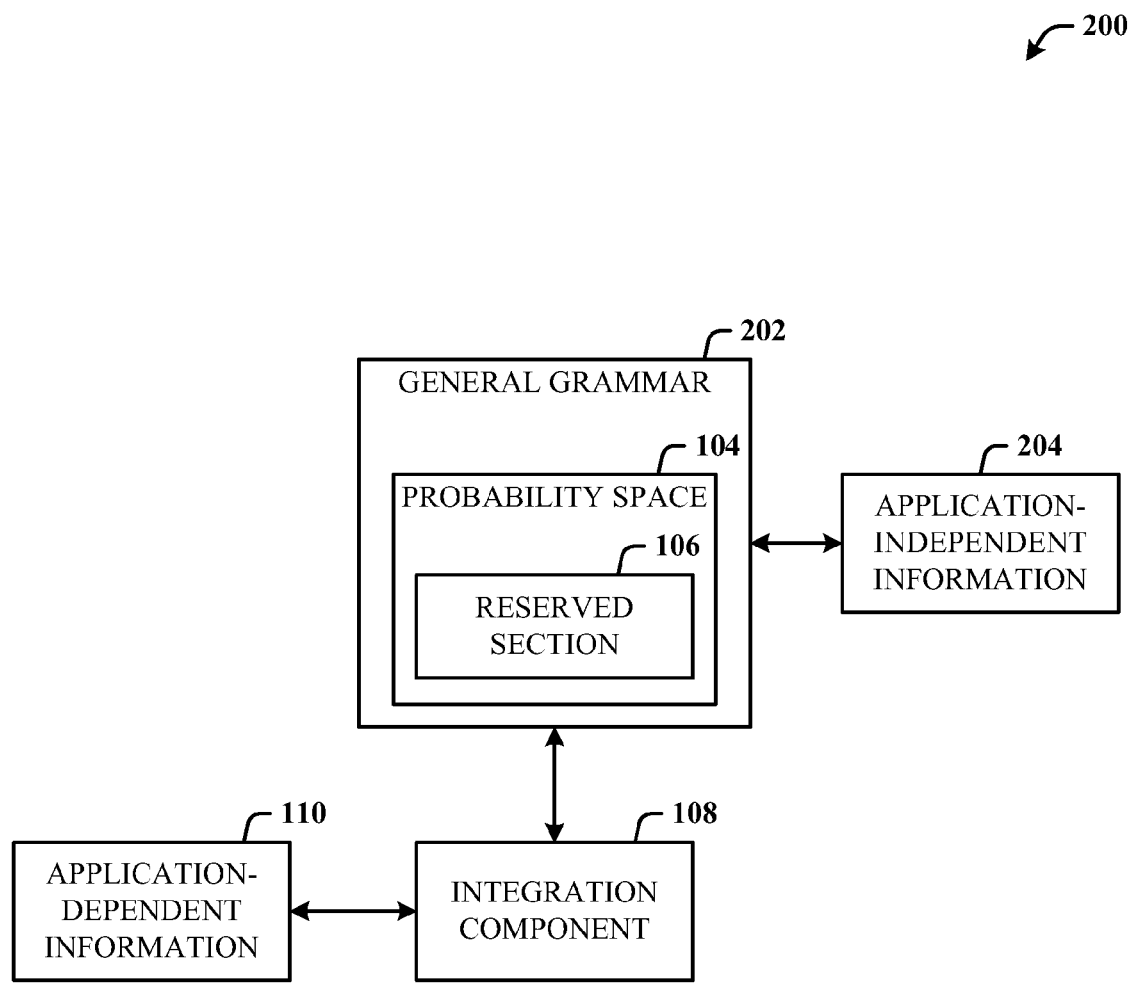
FIG. 2 illustrates an alternative embodiment of a recognition system.

FIG. 2 illustrates an alternative embodiment of a recognition system 200. The system 200 includes a general grammar 202 for recognition processing of data. The general grammar 202 includes the defined probability space 104. The general grammar 202 reserves the reserved section 106 of the probability space 104 for the integration (e.g., direct) of the application-dependent information 110. The reserved section 106 of the probability space 104 fluctuates based on user needs. Typically, there is not a predetermined amount of probability space 104 reserved for the actual deployment. The integration point between general and specific grammars can have a fixed value and the internal weighting of the specific grammars can be fixed to sum to one. Specifically, the reserved section 106 can be fixed or limited based on performance capabilities, for example. Thus, the reserved section 106 fluctuation depends on what the end user wants to accomplish within the performance limits. Accordingly, the integration point (e.g., amount of probability space 104 reserved) in the general grammar can be determined dynamically.

The integration component 108 is utilized to integrate the application-dependent information 110 into the reserved section 106 of the probability space 104. The application-dependent information 110 is integrated into the reserved section 106 of the probability space 104 post-deployment or time of use. Specifically, the application-dependent information 110 is late binding, or applied at the time of use, as opposed to pre-deployment. Accordingly, the application-independent information 204 is structured in such a way that an arbitrary amount of application-dependent information 110 is optimally integrated.

Further, the application-dependent information 110 can be integrated into the reserved section 106 of the probability space 104 when available. The application-dependent information 110 could be mined from user inboxes and then integrated into the reserved section 106 of the probability space 104. The inboxes could be mined offline and then applied when a user called, or the inboxes could be mined on demand based on when the user calls. Thus, the application-dependent information 110 can be obtained and integrated at any time once it becomes available.

Furthermore, the application-dependent information 110 that is integrated into the reserved section 106 can be applied to a specific instance of use or accumulated over multiple uses. For example, a specific piece of information such as a phone number can be placed in the grammar when the user associated with the phone number calls, and then the phone number is forgotten once the user hangs up. Alternatively, the system 200 can determine that the user called five different times and discussed this information the last four times, so the system is biased towards that information because it is likely that the next telephone call will be similar. Thus, the system 200 can accumulate information over many uses or have one particular instance of use.

Further, the application-dependent information 110 is optional and the general grammar 202 remains functional if the application-dependent information 110 is unavailable. Accordingly, the system 200 is constructed such that the application-dependent information 110 is not required, because there may be none. Moreover, if there is no application-dependent information 110, the system 200 will still function for the general user while being capable of functioning for the specific user of a specific scenario when the specific scenario actually exists.

Figure 3:
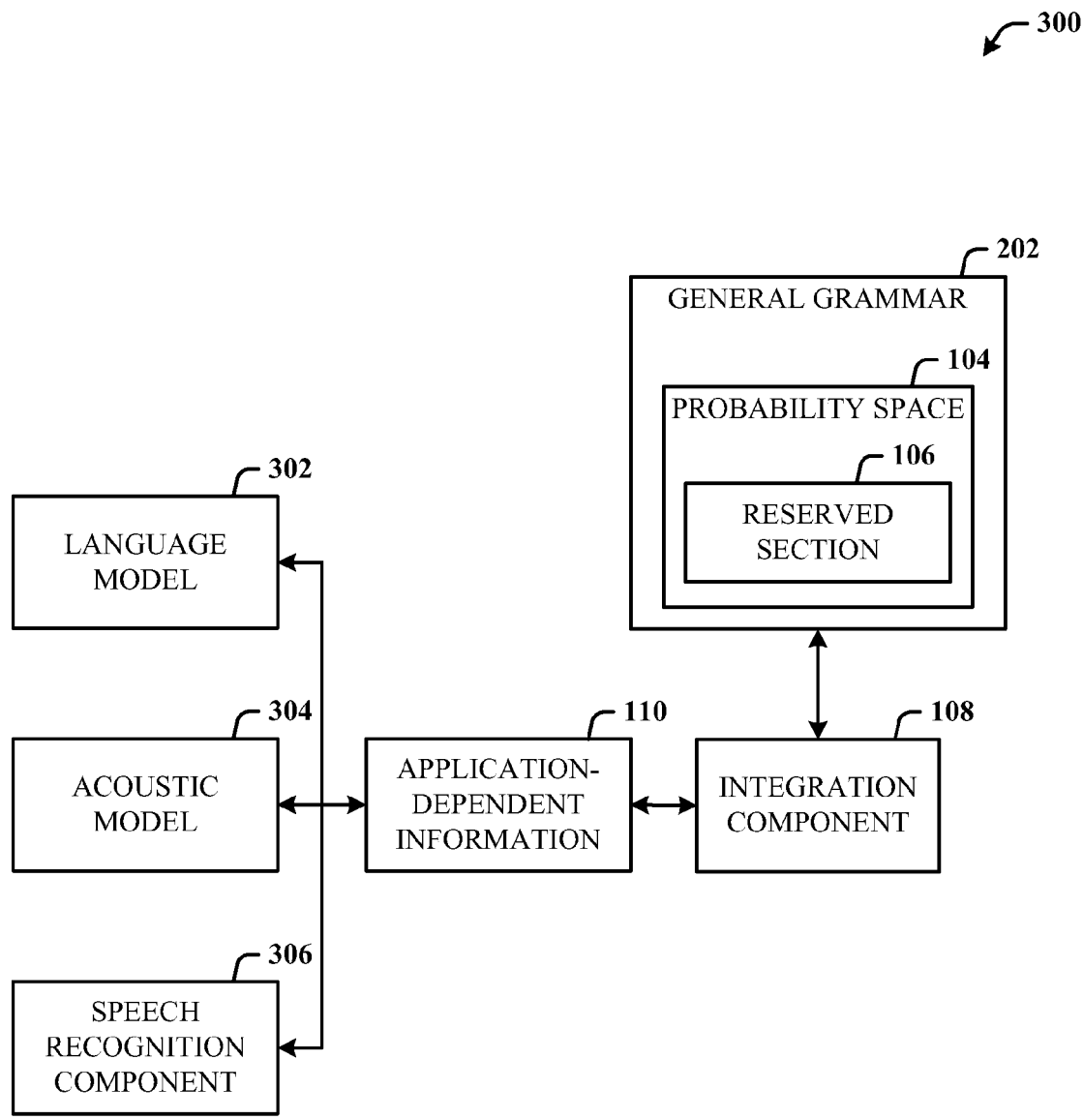
FIG. 3 illustrates an example of application-dependent information for a recognition system.

FIG. 3 illustrates an example of application-dependent information for a recognition system 300. The system 300 includes the general grammar 202 for recognition processing of data. The general grammar 202 defines the probability space 104 and then reserves the section 106 of the probability space 104 for the integration of application-dependent information 110. The integration component 108 integrates the application-dependent information 110 into the reserved section 106. The application-dependent information 110 is integrated into the reserved section 106 of the probability space 104 at deployment time or when available. Furthermore, the application-dependent information 110 can include a language model 302, an acoustic model 304, or other speech recognition component 306. These models and components (302, 304 and 306) can all be integrated into the reserved section 106 of the probability space 104 as needed by a specific user or class of users.

Additionally, certain categories of the application-dependent information 110 can be heavily biased. Specifically, the system 300 can be biased toward specific information unique to the user. For example, a user that places a call is very likely to state a telephone number or name, not an arbitrary telephone number or name, not a general telephone number or name, but a personal telephone number or name. Thus, the system 300 can be biased heavily towards the likelihood that the user will state a personal telephone number or name. This attributes to fewer mistakes as the system 300 will not bias for an arbitrary set of telephone numbers or names, but only for the user's personal telephone number or name.

The system 300 is also able to adjust more quickly to a caller. Accordingly, the system 300 can be set up by integrating a user's name, the caller's name, the user's contact list, the caller's contact list, etc., such that the user and caller have a shared set of names that are very likely to surface. The system 300 then biases this information with various weights based on the likelihood that the application-dependent information 110 will be used. The system 300 can also mine the user's email inbox to collect information that is important to the user but not important to the general population.

Furthermore, the application-dependent information 110 can include embedded slot grammars specific to a user from an n-gram language model. The integration component 108 can integrate custom slot grammars or can integrate a portion of those slot grammars into the reserved section 106 of the probability space 104. Generic slot grammars can be held-out in the probability space 104 for general application-specific data, and custom extension slot grammars can be held-out in the probability space 104 for custom additions to the language model. For example, the general grammars covering voicemail transcription provide open slots for recognition of telephone numbers, dates, times, names, and general vocabulary.

The general model uses broad grammars to satisfy these slots (e.g., covering all telephone numbers in the United States). These slots can be amended, at deployment, for example, by the application with custom information about the caller, callee, email history between the caller and callee, contact lists, and other relevant applicable information. This allows the addition of relevant data (e.g., using the integration component 108) to the general grammar at deployment time, post-deployment, and/or time of use. Note that dynamic grammar generation can be performed by a user and/or suitably-designed code, for example. By default the custom grammars are "void" and the integration component 108 can override the custom grammars to improve accuracy or modify semantic outputs. The custom extension grammars can be employed over the general, pre-populated rules by applying greater weighting. This is not a guarantee that the custom grammar will be utilized for a particular word sequence, however.

Additionally, the system 300 supports the use of an n-gram language model without slot grammars. Instead of slot grammars, user entries are utilized. Specifically with the use of n-gram language models, probability space is reserved for incorporating user entries which cannot be known at shiptime. Those entries can be mined from the user via entry in the user lexicon or from a user language model learned by observing user files and emails.

Figure 4:
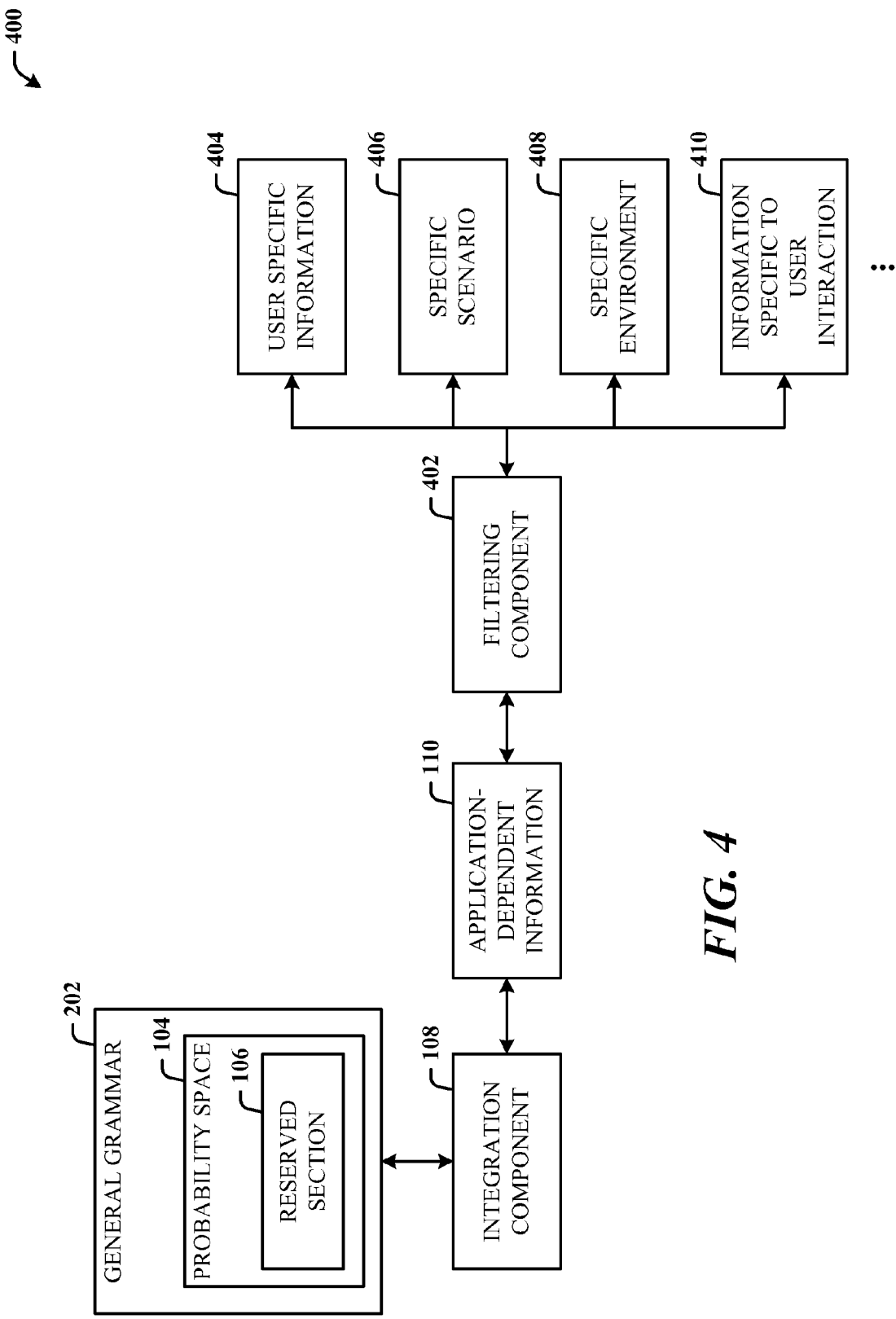
FIG. 4 illustrates a recognition system that further employs a filtering component for opt-in and opt-out of user information.

FIG. 4 illustrates a recognition system 400 that further employs a filtering component 402 for opt-in and opt-out of user information. User information can include user specific information 404, a specific scenario 406, a specific environment 408, or other information specific to the user interaction 410. Some or all of this user information can be used as the application-dependent information 110 to be integrated via the integration component 108 into the reserved section 106 of the probability space 104 of the general grammar 202. The decision mechanism by which information is accepted/rejected into the integration process can be based on security, privacy, etc.

The filtering component 402 provides the proper collection, storage, and access to the user information. Specifically, the filtering component 402 allows the user to opt-in and opt-out of tracking information as well as personal information that may have been obtained and utilized thereafter. The user can be provided with notice of the collection of personal information, for example, and the opportunity to provide or deny consent to do so. Consent can take several forms. Opt-in consent imposes on the user to take an affirmative action before the data is collected. Alternatively, opt-out consent imposes on the user to take an affirmative action to prevent the collection of data before that data is collected. This is similar to implied consent in that by doing nothing, the user allows the data collection after having been adequately informed.

The filtering component 402 also allows the user to access and update profile information. For example, the user can view the personal and/or tracking data that has been collected, and provide corrections. Where sensitive personal information such as health and financial information can be tracked and obtained during subscription or thereafter, the filtering component 402 ensures that the data is housed using security measures appropriate for the sensitivity of the data. Moreover, access to such information can be restricted using the filtering component 402 for access only to authorized viewers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
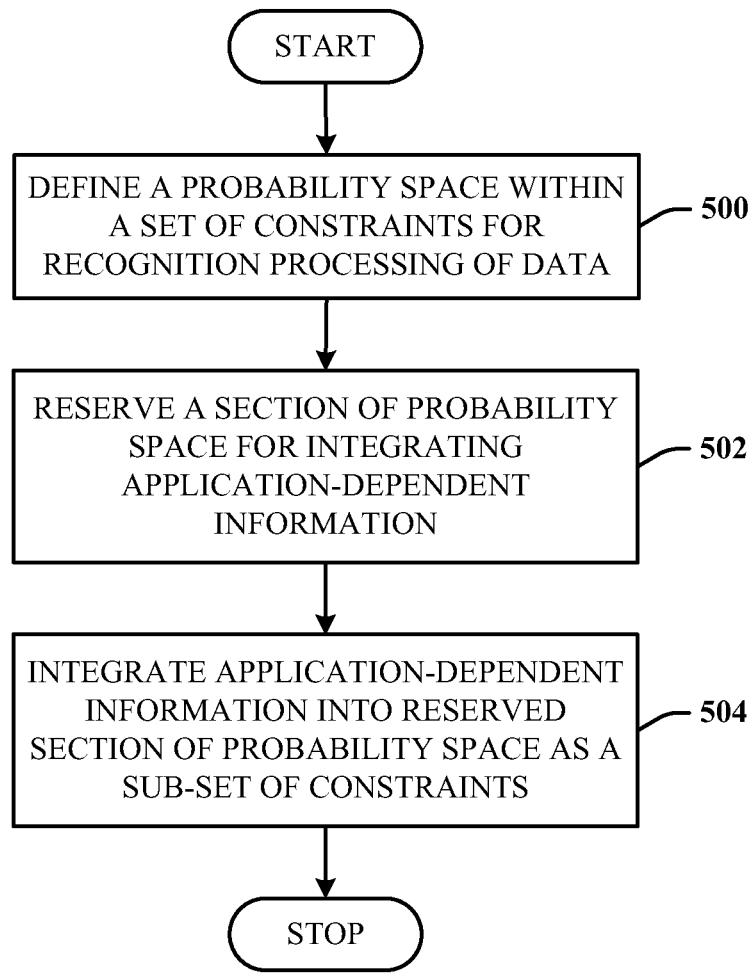
FIG. 5 illustrates a method of recognition processing of data.

FIG. 5 illustrates a method of recognition processing of data. At 500, a probability space is defined within a set of constraints for recognition processing of data. The probability space is retained to allow for the addition of new words that a user (or system) learns or new information that the user (or system) adds to the dictionary. Once these new words or new information are added to the probability space, the set of constraints, for example a general grammar, can recognize the information with a relatively high probability. At 502, a section of the probability space is reserved for integrating application-dependent information. The probability space is reserved based on knowing that at deployment or at the point at which customer information is discovered, the reserved section of the probability space will be integrated with application-dependent information specific to the user, specific to the environment, specific to the scenario, or other information specific to the interaction.

At 504, the application-dependent information is integrated into the reserved section of the probability space as a sub-set of the constraints. Generally, a grammar is created that can be filled by another sub-grammar or a reference to another grammar that is not known yet. An application then produces that sub-grammar and integrates it into the reserved section of the probability space. The general grammar is structured to restrictively support the integration. Thus, the integration of application-dependent information is a clean integration that improves the overall system.

Figure 6:
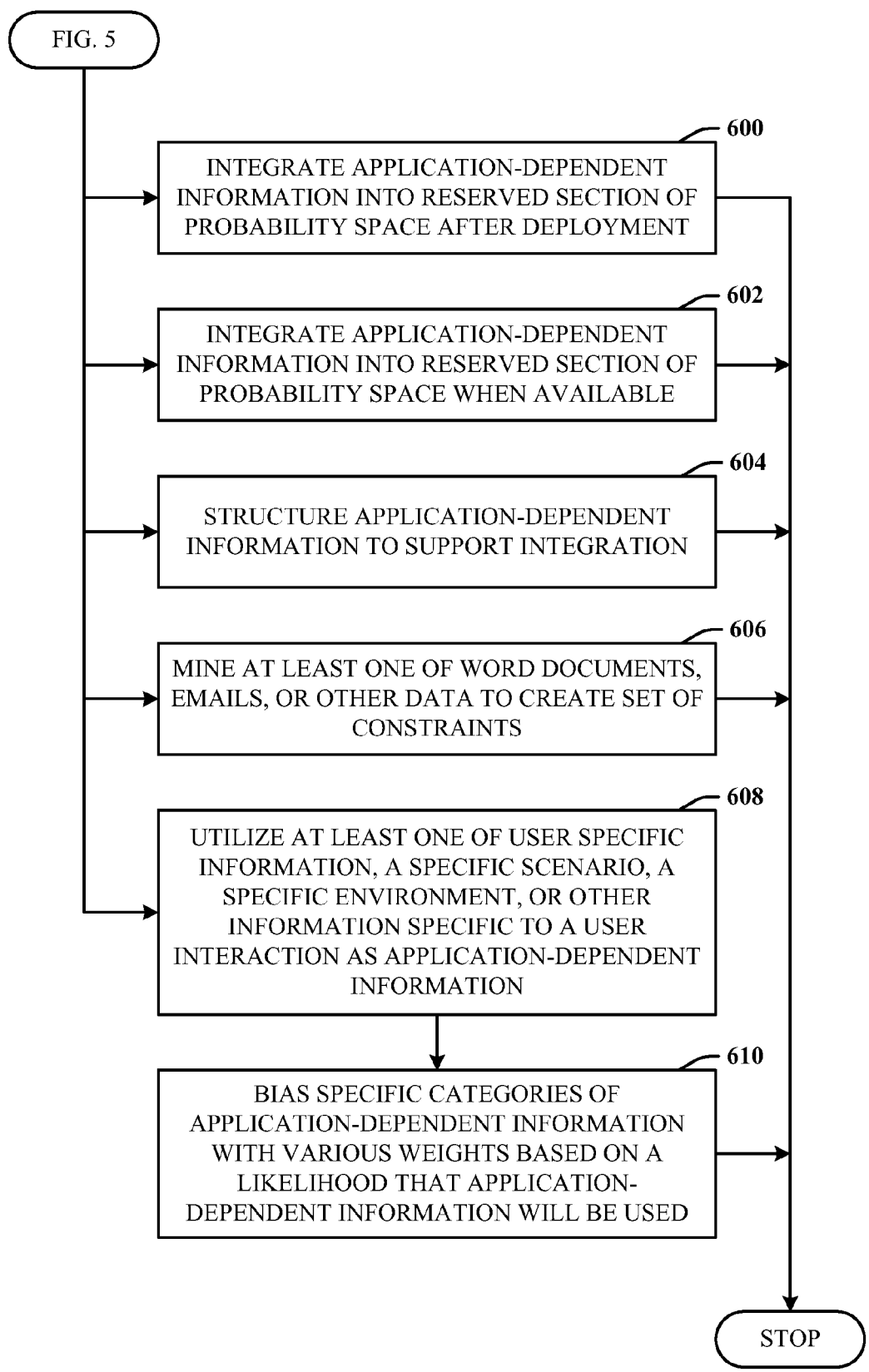
FIG. 6 illustrates additional aspects of the method of FIG. 5.

FIG. 6 illustrates additional aspects of the method of FIG. 5. At 600, the application-dependent information is integrated into the reserved section of the probability space after deployment. Specifically, the application-dependent information is late binding, or applied at the time of use, as opposed to pre-deployment. In other words, when the actual relevant recognition occurs, the grammars are rewritten with application dependent information. The application dependent information can be employed at deployment, per-recognition, or a combination of at deployment and per-recognition, for example. Accordingly, the application-independent information is structured in such a way that an arbitrary amount of application-dependent information is optimally integrated.

At 602, the application-dependent information is integrated into the reserved section of the probability space when available. The application-dependent information could be mined from user inboxes and then integrated into the reserved section of the probability space. The inboxes could be mined offline and then applied when a user called, or the inboxes could be mined on demand based on when the user calls. Thus, the application-dependent information can be obtained and integrated at any time once it becomes available.

At 604, the application-dependent information is structured to support (e.g., restrictively or optimally) the integration. At 606, at least one of word documents, emails, or other data to create the set of constraints which include a general grammar is mined. The general grammar can be created by mining word documents, emails, or other data, or the general grammar can be pre-manufactured and built with general information for a generalized user. Note that generally, a general grammar is provided (e.g., shipped) prior to the addition of the application dependent information (or grammars). At 608, at least one of user specific information, a specific scenario, a specific environment, or other information specific to a user interaction as application-dependent information is utilized. The application-dependent information is then integrated into the reserved section of the probability space of the general grammar.

At 610, specific categories of the application-dependent information are biased with various weights based on a likelihood that the application-dependent information will be used. Specifically, the method biases specific information unique to the user. For example, the method can be biased heavily towards the likelihood that the user will state a personal telephone number or name. This attributes to fewer mistakes as the method will not bias for an arbitrary set of telephone numbers or names, but only for the user's personal telephone number or name. The method is also able to adjust more quickly to a caller and biases information with various weights based on the likelihood that the application-dependent information will be used. The method can also mine the user's email inbox to pick up information that is important to the user but not important to the general population.

Furthermore, the disclosed architecture can be a server based system or a desktop based system. The voicemail model of the system is typically server based. However, the speech recognition model can be based on a desktop or integrated into a client/server architecture.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
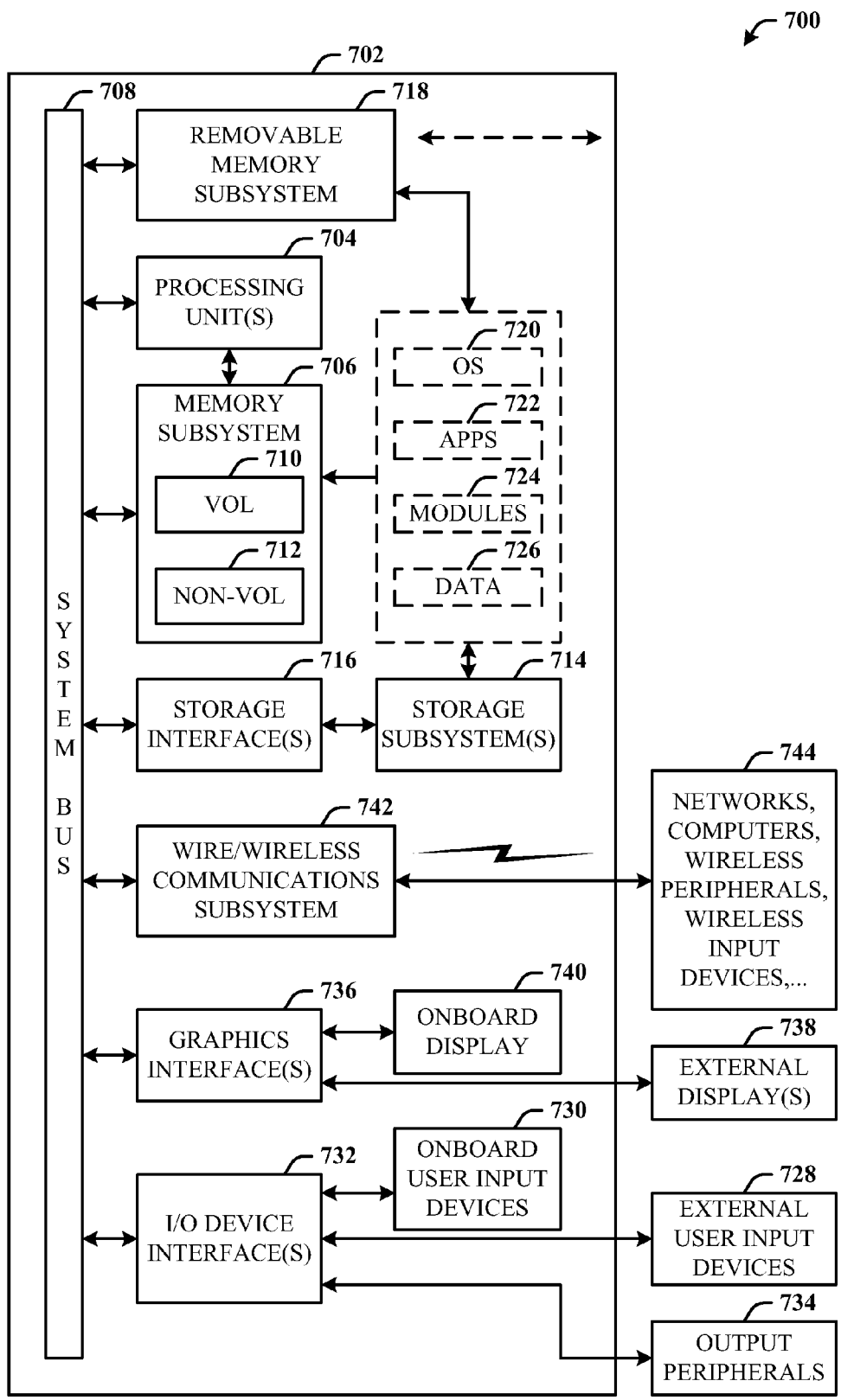
FIG. 7 illustrates a block diagram of a computer system operable to execute recognition processing of data in accordance with the disclosed architecture.

Referring now to FIG. 7, there is illustrated a block diagram of a computing system 700 operable to execute recognition processing of data in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include components and entities of the system 100 of FIG. 1, the application-independent information 202 of the system 200 of FIG. 2, the language model 302, acoustic model 304 and other speech recognition system 306 of the system 300 of FIG. 3, the security component 402, user specific information 404, specific scenario 406, specific environment 408, and information specific to user interaction 410 of the system 400 of FIG. 4, and the methods represented by the flow charts of FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 8:
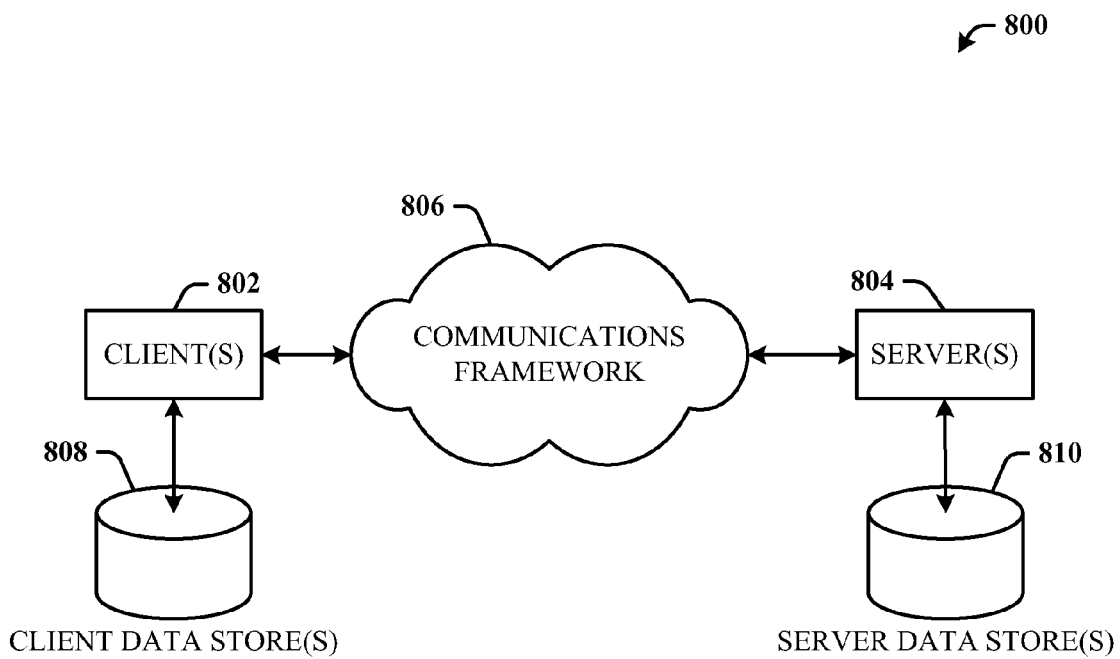
FIG. 8 illustrates a schematic block diagram of a computer environment for recognition processing of data.

Referring now to FIG. 8, there is illustrated a schematic block diagram of a computing environment 800 for the recognition processing of data. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented recognition system, comprising:
   a constraints component for parsing input data, the constraints component interfaces to a probability space;
   an integration component for integrating application-dependent information into the constraints component for the recognition processing, the application-dependent information comprises embedded slot grammars specific to a user from an n-gram language model; and
   a microprocessor that executes instructions stored in a memory.

2. The system of claim 1, wherein the constraints component, which includes a general grammar, reserves a section of the probability space for integration of the application-dependent information.

3. The system of claim 1, wherein the application-dependent information is integrated directly into a reserved section of the probability space post-deployment.

4. The system of claim 1, wherein the application-dependent information is integrated into a reserved section of the probability space when available.

5. The system of claim 1, wherein the constraints component is structured to support the integration.

6. The system of claim 1, wherein the application-dependent information comprises at least one of a language model, an acoustic model, or other speech recognition system.

7. The system of claim 1, wherein the application-dependent information applies to a specific instance of use.

8. The system of claim 1, wherein the application-dependent information accumulates over multiple uses.

9. The system of claim 1, wherein the application-dependent information is optional and the constraints component remains functional when the application-dependent information is unavailable.

10. A computer-implemented recognition system, comprising:
    a constraint components which includes a general grammar that contains application-independent information and a defined probability space, a section of the probability space reserved for integration of application-dependent information, the reserved section of the probability space is fixed or varies dynamically based on user needs;
    an integration component for integrating the application-dependent information directly into the reserved section of the probability space at time of use; and
    a microprocessor that executes instructions stored in a memory.

11. The system of claim 10, wherein the application-dependent information is structured to optimally support the integration.

12. The system of claim 10, wherein the application-dependent information comprises embedded slot grammars specific to a user from an n-gram language model.

13. The system of claim 10, wherein the application-dependent information applies to a specific instance of use or accumulates over multiple uses.

14. A computer-implemented method of recognition processing of data, comprising:
    defining a probability space within a set of constraints for recognition processing of data;
    reserving a section of the probability space for integrating application-dependent information;
    utilizing at least one of user specific information, a specific scenario, a specific environment, or other information specific to a user interaction as application-dependent information;
    integrating the application-dependent information into the reserved section of the probability space as a sub-set of the constraints; and
    utilizing a microprocessor that executes instructions stored in a memory.

15. The method of claim 14, further comprising integrating the application-dependent information into the reserved section of the probability space after deployment.

16. The method of claim 14, further comprising integrating the application-dependent information into the reserved section of the probability space when available.

17. The method of claim 14, further comprising structuring the application-dependent information to support the integration.

18. The method of claim 14, further comprising mining at least one of word documents, emails, or other data to create the set of constraints, which include a general grammar.

19. The method of claim 14, further comprising:
    biasing specific categories of the application-dependent information with various weights based on a likelihood that the application-dependent information will be used.

* * * * *